United States Patent [19]

Orlitzky

[11] Patent Number: 5,622,239
[45] Date of Patent: Apr. 22, 1997

[54] GEAR WHEEL LUBRICATOR

[75] Inventor: Anton Orlitzky, Delta, Canada

[73] Assignee: A.T.S. Electro-Lube Holdings Ltd., Delta, Canada

[21] Appl. No.: 502,506

[22] Filed: Jul. 14, 1995

[51] Int. Cl.⁶ .................................................. F01M 9/00
[52] U.S. Cl. ........................... 184/6.12; 184/39; 74/467; 74/468
[58] Field of Search .................... 184/6.12, 30, 40, 184/41, 42; 74/467, 468

[56] References Cited

U.S. PATENT DOCUMENTS

| | | | |
|---|---|---|---|
| 3,424,022 | 1/1969 | Greenberg et al. | 74/468 |
| 3,822,607 | 7/1974 | Tharaldsen | 74/468 |
| 4,023,648 | 5/1977 | Orlitzky . | |
| 4,328,843 | 5/1982 | Fujii | 141/98 |
| 4,671,386 | 6/1987 | Orlitzky . | |
| 5,242,033 | 9/1993 | Toraason | 74/468 |
| 5,404,966 | 4/1995 | Yang | 184/39 |

FOREIGN PATENT DOCUMENTS

| | | | |
|---|---|---|---|
| 567679 | 10/1975 | Switzerland | 74/468 |
| 1710890 | 2/1992 | U.S.S.R. | 74/468 |
| 561250 | 5/1944 | United Kingdom | 184/6.12 |

*Primary Examiner*—Thomas E. Denion
*Attorney, Agent, or Firm*—Townsend and Townsend and Crew LLP

[57] ABSTRACT

An apparatus to lubricate a main component. There is an idler in contact with the main component and an inlet in the idler to receive lubricant. There is at least one outlet in the idler at a point where the idler contacts the main component. A passageway in the idler links the inlet and the outlet. Lubricant can be forced into the inlet, through the passageway to the outlet so that lubricant is thus applied from the idler to the main component. The invention finds particular application in the lubrication of gear wheels and chains where the idler is a sprocket able to engage with the gear wheel or chain.

7 Claims, 3 Drawing Sheets

GEAR WHEEL LUBRICATOR

FIELD OF THE INVENTION

This invention relates to an apparatus to lubricate a main component, for example a gear wheel or chain.

DESCRIPTION OF THE PRIOR ART

Lubrication is vital for all moving parts.

In many environments it is difficult to provide proper lubrication. It is either dangerous, for example in the case of moving machinery, or the machinery is in an inhospitable or inaccessible environment. The appeal of automated lubrication is also readily apparent.

Applicant has developed electrical driven lubrication equipment to provide continuous lubrication of machinery in these circumstances. The equipment, which is generally available under the trademark Electro-Luba, has, in a preferred embodiment, a reservoir, preferably translucent, to hold a lubricant. The reservoir has an outlet. There is a diaphragm at the top of the lubricant reservoir or, in preferred embodiments, a piston that can be driven by an expandable bellows. Above the diaphragm or bellows is an electrochemical cell that includes an electrolyte. There are batteries housed in a chamber above the electrolyte and switches, resistors and an electronic circuit board. These electrical components are used to control the rate of reaction in the electrochemical cell. That reaction generates a gas from the electrolyte. Typically the gas is nitrogen. Nitrogen has the advantage of being chemically inert.

To use this equipment, the appropriate selected switches are closed to allow the batteries to start the reaction in the electrochemical cell. The nitrogen in the bellows acts to force the bellows downwardly. This moves the piston downwardly which forces the lubricant out of the lubricant reservoir, through the outlet. The lubricant outlet is easily connected, typically by a threaded connection, to a piece of machinery that needs to be lubricated. By closing a differing number of switches, the strength of the electrical current can be varied and thus the amount of gas produced. The more gas that is produced, the greater the rate of lubricant flow but, of course, the duration of operation is reduced. The less gas developed the longer the duration. The dispenser also typically include a light, referred to as a blip light, that flashes to indicate that the system is in working order.

Equipment of this nature has received good acceptance and has a number of advantages. It is reliable. It can work for up to one year in all sorts of adverse conditions and, the rate of chemical reaction can be varied to meet conditions. The rate of dispensing of the lubricant can be increased or decreased during operation.

Continuous feed of a small amount of lubricant tends to push out contaminants from a bearing whereas with a more conventional periodic lubrication with a grease gun, the contaminants are not moved out until the fresh grease is applied. With the above equipment a constant flow is achieved.

Cooling of a bearing, causes a contraction which tends to develop a slight vacuum. Foreign matter may thus be drawn into the bearings. However, with the above dispenser positive pressure is always applied so that this drawing in of contaminants does not take place.

Localized use of lubricant can take place using conventional systems and this is avoided with a constant supply of lubricant. The cooling effect of lubrication is improved by the constant application of fresh lubricant.

As a result of the above, this equipment has found use all over the world. It is used on railways, on conveyors, in pumps, in mines, on motors, on motor operated valves, all sorts of bearings and in all sorts of locations.

The equipment is, for example, described and claimed in U.S. Pat. Nos. 4,023,648 and 4,671,386, the disclosures of which patents are incorporated specifically herein by reference.

The present invention seeks to provide apparatus able to provide continuous lubrication of a component that might not normally be lubricated adequately. In a preferred embodiment the apparatus is used with equipment as described above that uses gas pressure to provide a constant dispensing of lubricant.

SUMMARY OF THE INVENTION

In its broadest aspect, the present invention is an apparatus to lubricate a main component comprising an idler to contact said main component; an inlet in said idler to receive lubricant; at least one outlet in said idler at a point where the idler contacts the main component; a passageway in said idler linking said inlet and said at least one outlet; and means to force lubricant into said inlet, through said passageway to said outlet whereby lubricant is applied to said main component.

In a further aspect the present invention is an apparatus to lubricate a main gear comprising an idler gear having teeth to mesh with said main gear; an inlet in said idler gear to receive lubricant; at least one outlet in a tooth of the idler gear; a passageway in said idler gear linking said inlet and said at least one outlet; and means to force lubricant into said inlet, through said passageway to said outlet, whereby lubricant is applied to said main gear.

Desirably the inlet is at the center of the idler gear and there is an outlet in each tooth of the idler gear. The idler may be carried on a bracket having bearings that carry the idler.

In a particularly preferred embodiment, the means to force the lubricant is a lubricant dispenser as described above that is attached to the idler gear with the outlet of the dispense communicating with the inlet of the idler gear.

In another preferred embodiment the main component is a chain and the idler again is an idler gear that meshes with the chain. Desirably a felt is mounted on the idler gear to allow the feeding of oil to the chain. It should be noted that the main component and the idler need not be toothed. It is sufficient that the idler and the main component be smooth surfaced so that lubricant can pass out from the idler on to the main component to apply lubrication.

DESCRIPTION OF THE PREFERRED EMBODIMENTS

Figure 1:
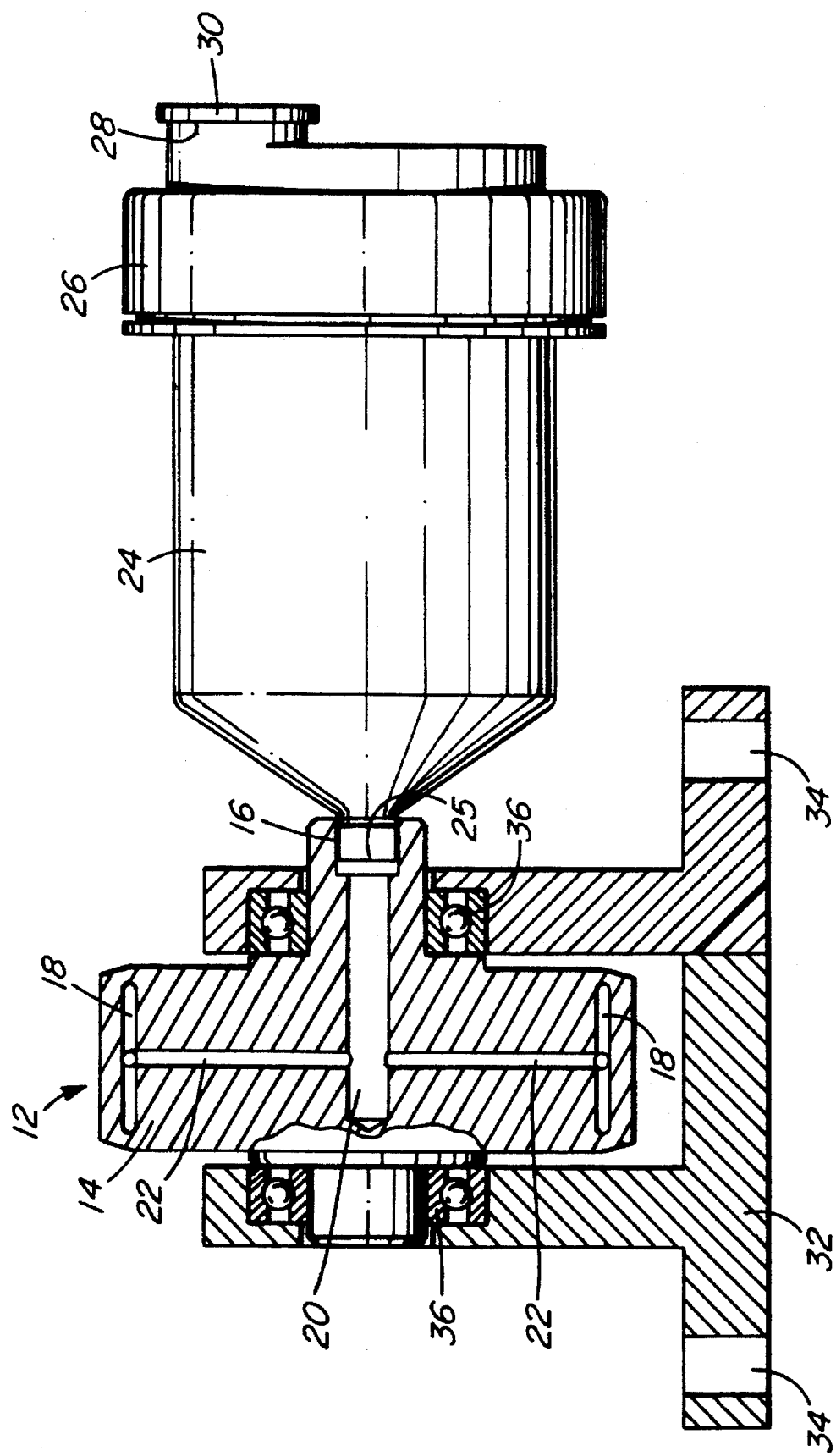
FIG. 1 is a side elevation, partly in section, of apparatus according to the present invention.
Figure 2:
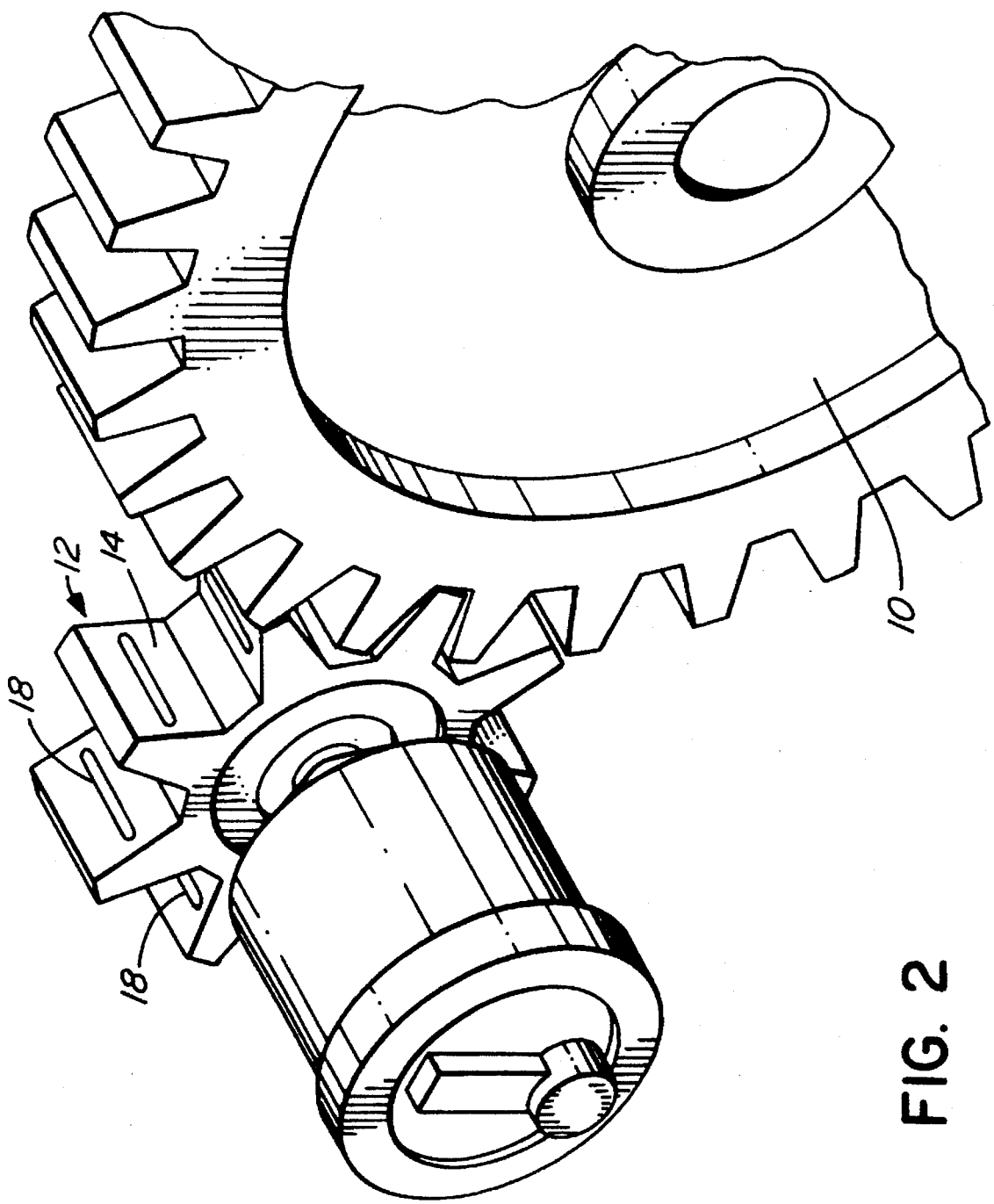
FIG. 2 is a detail of the equipment of the present invention.

FIGS. 1 and 2 show an apparatus to lubricate a main gear 10, shown in FIG. 2. There is an idler gear 12 having teeth 14 that mesh with the main gear as shown in FIG. 2. As shown most clearly in FIG. 1 there is an inlet 16 in the idler gear 10 to receive lubricant. The invention requires at least one outlet 18 and FIGS. 1 and 2 show a plurality of elongated outlets 18 formed in the teeth 14 of the idler gear 12.

There is a passageway in the idler gear comprising a main passage 20, extending axially of the idler gear 12, and subsidiary passageways 22 extending radially of the idler gear 12 to the outlets 18 in the teeth 14 of the idler gear 12. Thus the passageway in the idler gear 12 links the inlet 16 and the outlets 18 to feed lubricant through the outlets 18.

There is means to force lubricant into the inlet 16, through the passageway to the outlets 18 so that grease is constantly applied to the main gear 10. As shown generally in FIG. 1 and FIG. 2, this means comprises a dispenser having a chamber 24 to contain the lubricant. Chamber 24 has an outlet 25. Although not shown in any detail, —it does not form part of the present invention—there is an upper part 26 of the dispenser having an opening 28 with a cap 30 to provide access to switches (not shown). The switches can be set to control the rate of chemical reaction which is instigated by current developed in small, typically 1.5, volt batteries located within the upper part 26. Details of the structures may be found, for example, in U.S. Pat. Nos. 4,023,648 and 4,671,386 incorporated herein by reference.

As shown in FIG. 1 the idler gear 10 may be mounted in a bracket 36, having mounting openings 34 so that it may be bolted in place. There are also conventional bearings 36, ball bearings are shown, to facilitate the idling motion of the idler gear 12.

It should be noted that the dispenser chamber 24 rotates with the idler gear 12. Typically the outlet 25 is provided with an external thread that can engage an internal thread formed in the idler gear 12.

To use the invention as shown in FIG. 1, the equipment is set up as shown in FIG. 1. The bracket 32 carrying the idler gear 12 will be mounted in such a way that the position shown in FIG. 2 is achieved, that is the idler gear 12 is meshed with the main gear 10. Using the information now available in the art, the user selects a setting for the switches in opening 28 to dispense the contents of the chamber 24. In general the switches permit the dispensing of the contents of the chamber in as little as fourteen days or as long as one year.

Once the switches are set a chemical reaction is started that generates a gas, usually nitrogen, which provides pressure that forces the lubricant out of the outlet 24 into the passageway 20, out through the outlets 18 of the idler gear 12 onto the surfaces of the main gear 10. In this way the lubricant is carried on the main gear 10 to where it is required, typically where the main gear will be driven.

The embodiment of FIGS. 1 and 2 finds particular application on large ring gears that need to be lubricated, for example in windmills used in the generation of electrical power, in cranes and the like. They have a particular advantage of providing constant lubrication.

Figure 3:
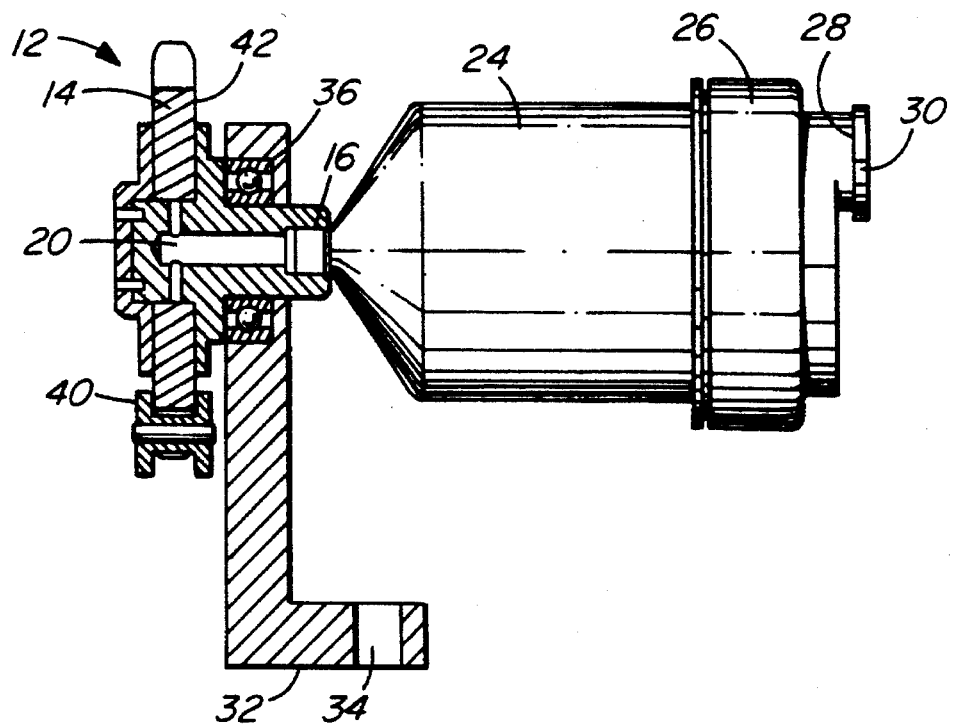
FIG. 3 is a side elevation similar to FIG. 1 of a further preferred embodiment.
Figure 4:
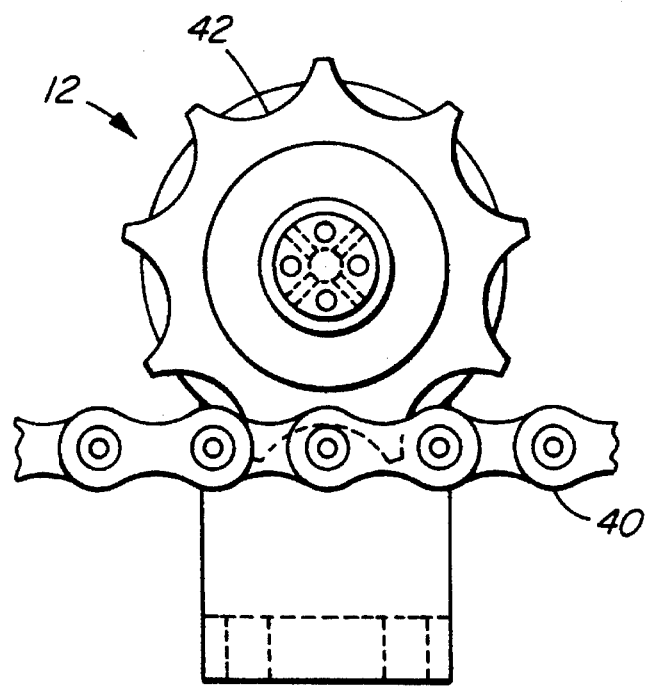
FIG. 4 is an end view of the apparatus of FIG. 3.

FIGS. 3 and 4 show the invention applied to lubrication of the chain. The apparatus is similar to that shown in FIGS. 1 and 2 and common reference numerals are used for common parts. The main difference is that FIGS. 3 and 4 show the lubrication of a chain 40 that engages idler 12, as shown particularly in FIG. 4. To facilitate the application of lubricant, which is usually oil for the chain, the idler 12 is equipped with a circumferential felt 42 that contacts the chain 40 to apply lubricant to it as the teeth of the idler 12 are rotated by the chain 40.

For the rest, the operation of the embodiment of FIGS. 3 and 4 is as described for FIGS. 1 and 2.

A variation of the above is to use smooth surfaced components although there is probably not the same demand for that. However, for example, a smooth belt that might need to be lubricated can contact a smooth idler having at least one opening at its periphery to receive lubricant from a dispenser 24.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. Apparatus to lubricate a main component comprising:

an idler to contact said main component;

an inlet in said idler to receive lubricant;

at least one outlet in said idler at a point where the idler contacts the main component;

a passageway in said idler linking said inlet and said at least one outlet; and a lubricant dispenser attached to said idler with an outlet of the dispenser communicating with the inlet of the idler gear, the dispenser comprising a chamber containing a lubricant with means to generate gas to develop pressure to force lubricant into said inlet, through said passageway, to said outlet whereby lubricant is applied tog and retained by, said main component.

2. Apparatus to lubricate a main gear comprising:

an idler gear having teeth to mesh with said main gear;

an inlet in said idler gear to receive lubricant;

at least one outlet in a tooth of the idler gear;

a passageway in said idler gear linking said inlet and said at least one outlet; and a lubricant dispenser attached to said idler with an outlet of the dispenser communicating with the inlet of the idler gear, the dispenser comprising a chamber containing a lubricant with means to generate gas to develop pressure to force lubricant into said inlet, through said passageway, to said outlet, whereby lubricant is applied to, and retained by said main component.

3. Apparatus as claimed in claim 2 in which the inlet is at the center of the idler gear.

4. Apparatus as claimed in claim 3 in which there are outlets in each tooth of the idler gear.

5. Apparatus as claimed in claim 2 including a bracket to carry said idler gear.

6. Apparatus as claimed in claim 5 in which the bracket is provided with bearings to carry said idler gear to facilitate rotation of said idler gear.

7. Apparatus as claimed in 2 in which the gas is nitrogen developed by electrochemical means.

\* \* \* \* \*